US012646826B2

(12) United States Patent
Lai et al.

(10) Patent No.: US 12,646,826 B2
(45) Date of Patent: Jun. 2, 2026

(54) ELECTRONIC PACKAGE AND MANUFACTURING METHOD THEREOF

(71) Applicant: SILICONWARE PRECISION INDUSTRIES CO., LTD., Taichung (TW)

(72) Inventors: Yi-Chun Lai, Taichung (TW); Hsuan-Jen Wang, Taichung (TW); Rung-Jeng Lin, Taichung (TW)

(73) Assignee: SILICONWARE PRECISION INDUSTRIES CO., LTD., Taichung (TW)

( * ) Notice: Subject to any disclaimer, the term of this patent is extended or adjusted under 35 U.S.C. 154(b) by 225 days.

(21) Appl. No.: 18/146,924

(22) Filed: Dec. 27, 2022

(65) Prior Publication Data

US 2024/0145908 A1 May 2, 2024

(30) Foreign Application Priority Data

Oct. 26, 2022 (TW) .................................. 111140686

(51) Int. Cl.
*H01Q 1/38* (2006.01)
*H01Q 1/24* (2006.01)

(52) U.S. Cl.
CPC ............... *H01Q 1/38* (2013.01); *H01Q 1/243* (2013.01)

(58) Field of Classification Search
CPC ........ H01Q 1/38; H01Q 1/243; H01Q 21/065; H01Q 1/2283; H01L 23/66; H01L 21/50
See application file for complete search history.

(56) References Cited

U.S. PATENT DOCUMENTS

| | | | | |
|---|---|---|---|---|
| 2012/0280380 A1* | 11/2012 | Kamgaing | H01Q 21/0093 | 343/893 |
| 2019/0067219 A1* | 2/2019 | Lasiter | H01L 23/66 | |
| 2019/0067221 A1* | 2/2019 | Lasiter | H01Q 1/2283 | |
| 2019/0334231 A1* | 10/2019 | Sakurai | H01L 23/66 | |
| 2020/0035625 A1* | 1/2020 | Wang | H01L 21/6835 | |
| 2022/0102835 A1* | 3/2022 | Makurin | H01Q 1/52 | |
| 2022/0320020 A1* | 10/2022 | Hsu | H01L 23/5384 | |

FOREIGN PATENT DOCUMENTS

WO WO-2019196598 A1 * 10/2019 ........... H01L 23/488

* cited by examiner

*Primary Examiner* — Dieu Hien T Duong
(74) *Attorney, Agent, or Firm* — Studebaker Brackett PLLC

(57) ABSTRACT

An electronic package and a manufacturing method thereof are provided, in which an electronic element is disposed on a carrier structure, and an antenna structure is stacked on the carrier structure via conductors, where at least one through hole is formed on and penetrating through the antenna structure, and an insulating support body is formed between the carrier structure and the antenna structure, so that the insulating support body is correspondingly formed at the through hole and/or an edge of the antenna structure, and the through hole is free from being filled up by the insulating support body, such that the through hole has an air medium. The design of the through hole allows the characteristic of the dielectric constant of air being 1 to be utilized so as to reduce the signal loss and the signal offset, thereby facilitating the signal transmission of the antenna body.

16 Claims, 7 Drawing Sheets

ELECTRONIC PACKAGE AND MANUFACTURING METHOD THEREOF

BACKGROUND

1. Technical Field

The present disclosure relates to a semiconductor package, and more particularly, to an electronic package with an antenna structure and manufacturing method thereof.

2. Description of Related Art

Nowadays, wireless communication technology has been widely applied to various consumer electronic products (such as cell phones, tablet computers, etc.) to facilitate receiving or transmitting various wireless signals. Meanwhile, the manufacturing and design of wireless communication modules are developed toward requirements of light, thin, short and small in order to meet the portability and internet convenience of consumer electronic products, wherein patch antenna with characteristics of small volume, light weight and easy manufacturing is used widely in the wireless communication modules of electronic products.

FIG. 1 is a schematic perspective view of a conventional wireless communication module 1. As shown in FIG. 1, the wireless communication module 1 includes: a substrate 10, a plurality of electronic elements 11 disposed on the substrate 10, an antenna structure 12 and an encapsulant 13. The substrate 10 is a circuit board and has a rectangular shape. The plurality of electronic elements 11 are disposed on and electrically connected to the substrate 10. The antenna structure 12 is of a planar type and has an antenna body 120 and a wire 121, and the antenna body 120 is electrically connected to the electronic element 11 via the wire 121. The encapsulant 13 covers the electronic elements 11 and portions of the wire 121.

However, in the conventional wireless communication module 1, the manner of transmitting signal is constrained by the encapsulant 13 (which may cause great amount of signal loss and signal offset) since the antenna structure 12 is of a planar type. Thus, the signal transmission can only be carried out by the wire 121 rather than by a coupling manner, thereby limiting the function of the antenna structure 12, so that the wireless communication module 1 cannot provide required electrical functions for operating a 5G communication system and cannot meet the requirements of the antenna operation of the 5G communication system.

Therefore, how to overcome the aforementioned drawbacks of the prior art has become an urgent issue to be addressed at present.

SUMMARY

In view of the various shortcomings of the prior art, the present disclosure provides an electronic package, which comprises: a carrier structure having a circuit layer; an electronic element disposed on the carrier structure and electrically connected to the circuit layer; and an antenna structure stacked on the carrier structure, wherein the antenna structure comprises a base configured with an antenna body, wherein the base has at least one through hole penetrating through the base, and the through hole has an air medium.

The present disclosure also provides a method of manufacturing an electronic package, the method comprises: providing a carrier structure having a circuit layer; disposing an electronic element on the carrier structure, wherein the electronic element is electrically connected to the circuit layer; and stacking an antenna structure on the carrier structure, wherein the antenna structure comprises a base configured with an antenna body, wherein the base is formed with at least one through hole penetrating through the base, and the through hole has an air medium.

In the aforementioned electronic package and method, the carrier structure has a first surface and a second surface opposing the first surface, wherein the electronic element is disposed on the first surface, and the antenna structure is disposed on the second surface.

In the aforementioned electronic package and method, the antenna body has a plurality of antenna layers separated from each other and disposed on opposite sides of the base respectively. For instance, the plurality of antenna layers transmit signal in a coupling manner.

In the aforementioned electronic package and method, the present disclosure further comprises forming an insulating support body between the antenna structure and the carrier structure, wherein the insulating support body is correspondingly formed at the through hole and/or an edge of the antenna structure, wherein the through hole is free from being filled up by the insulating support body, such that the through hole has the air medium. Besides, the base is stacked on the carrier structure via conductors. For instance, the conductors are electrically connected to the antenna body and the circuit layer.

In the aforementioned electronic package and method, the base and the carrier structure have at least one air gap formed therebetween.

In the aforementioned electronic package and method, the present disclosure further comprises forming a plurality of conductive elements on the carrier structure, wherein the plurality of conductive elements are electrically connected to the circuit layer.

As can be understood from the above, in the electronic package and manufacturing method thereof of the present disclosure, the design of the through hole allows the characteristic of the dielectric constant of air being 1 to be utilized so as to reduce the signal loss and the signal offset, thereby facilitating the signal transmission of the antenna body. Therefore, compared with the prior art, the through hole is disposed around the antenna layer so as to effectively improve the performance gain and efficiency of the antenna body, such that the strength of the electric field of the antenna body is enhanced to facilitate the signal transmission.

BRIEF DESCRIPTION OF THE DRAWINGS

FIG. 2A, FIG. 2B, FIG. 2C-1, FIG. 2D, FIG. 2E and FIG. 2F are schematic cross-sectional and planar views illustrating a method of manufacturing an electronic package according to the present disclosure.

FIG. 2C-2 is a schematic cross-sectional view of an A-A section line of FIG. 2C-1.

DETAILED DESCRIPTIONS

Figure 1:
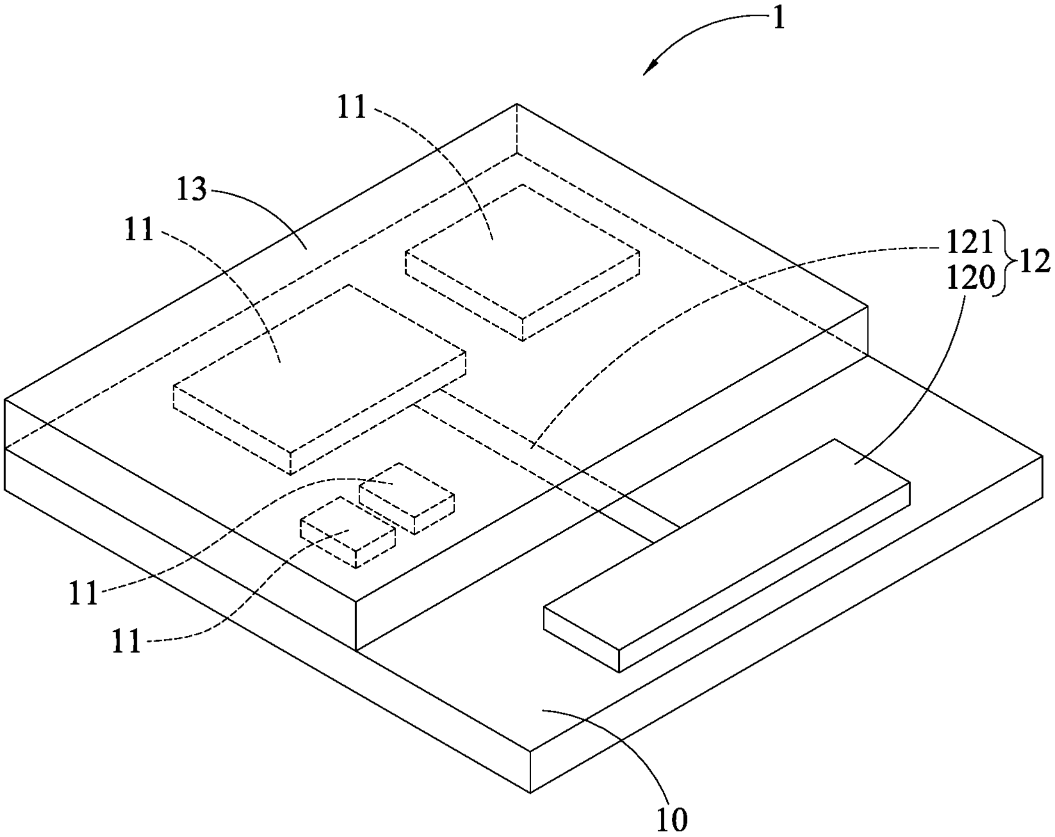
FIG. 1 (PRIOR ART)
FIG. 1 is a schematic cross-sectional view of a conventional wireless communication module.

Implementations of the present disclosure are illustrated using the following embodiments. One of ordinary skill in the art can readily appreciate other advantages and technical effects of the present disclosure upon reading the content of this specification.

It should be noted that the structures, ratios, sizes, etc. shown in the drawings appended to this specification are to be construed in conjunction with the disclosure of this specification in order to facilitate understanding of those skilled in the art. They are not meant to limit the implementations of the present disclosure, and therefore have no substantial technical meaning. Any modifications of the structures, changes of the ratio relationships, or adjustments of the sizes, are to be construed as falling within the range covered by the technical content disclosed herein to the extent of not causing changes in the technical effects created and the objectives achieved by the present disclosure. Meanwhile, terms such as "on," "first," "second," "a," "one," and the like recited herein are for illustrative purposes, and are not meant to limit the scope in which the present disclosure can be implemented. Any variations or modifications to their relative relationships, without changes in the substantial technical content, should also to be regarded as within the scope in which the present disclosure can be implemented.

FIG. 2A, FIG. 2B, FIG. 2C-1, FIG. 2D, FIG. 2E and FIG. 2F are schematic cross-sectional and planar views illustrating a method of manufacturing an electronic package 2 according to the present disclosure.

Figure 2A:
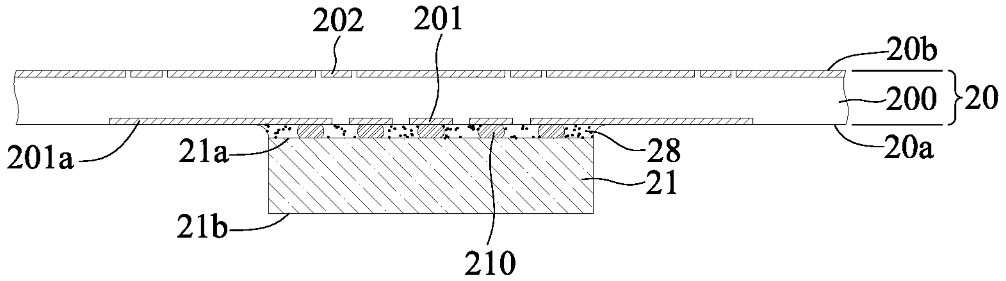

As shown in FIG. 2A, a carrier structure 20 is provided and has a first surface 20*a* and a second surface 20*b* opposing the first surface 20*a*, and at least one electronic element 21 is disposed on the first surface 20*a* of the carrier structure 20.

In an embodiment, the carrier structure 20 is a circuit structure with a core layer or a coreless circuit structure, such as a packaging substrate, and the carrier structure 20 can include at least one insulation layer 200 and circuit layers 201, 202 disposed on the insulation layer 200. For instance, in the carrier structure 20, fan-out type copper circuit layers 201, 202 can be formed in the form of a redistribution layer (RDL), and the material for forming the insulation layer 200 is a dielectric material such as polybenzoxazole (PBO), polyimide (PI), prepreg (PP), or the like. It should be understood that the carrier structure 20 can also be other components for carrying the electronic element 21 such as a chip. For example, the carrier structure 20 can be a silicon interposer, and the present disclosure is not limited to as such.

Moreover, the carrier structure 20 has a plurality of external contacts 201*a* on parts of the circuit layer 201 on the first surface 20*a*. It should be understood that circuit can be arranged inside the carrier structure 20 according to requirements, thus it is omitted in the drawings.

The electronic element 21 is an active element, a passive element, or a combination of the active element and the passive element, etc. The electronic element 21 is disposed on the first surface 20*a* of the carrier structure 20 and electrically connected to the circuit layer 201 of the first surface 20*a* of the carrier structure 20, wherein the active element is for example a radio-frequency (RF) semiconductor chip, and the passive element is for example a resistor, a capacitor, or an inductor.

In an embodiment, the electronic element 21 is an active element, such as a semiconductor chip with function of emitting 5G millimeter wave (mmWave). The electronic element 21 has an active surface 21*a* and an inactive surface 21*b* opposing the active surface 21*a*, such that the active surface 21*a* is disposed on the carrier structure 20 via a plurality of conductive bumps 210 such as solder material in a flip-chip manner and is electrically connected to the circuit layer 201, and the plurality of conductive bumps 210 can be covered with an encapsulation layer 28 such as an underfill according to requirements; alternatively, the electronic element 21 can also be electrically connected to the circuit layer 201 via a plurality of bonding wires (not shown) in a wire-bonding manner; or, the electronic element 21 can directly contact the circuit layer 201 to electrically connect the circuit layer 201. However, the manner in which the electronic element 21 is electrically connected to the circuit layer 201 is not limited to the above.

Figure 2B:
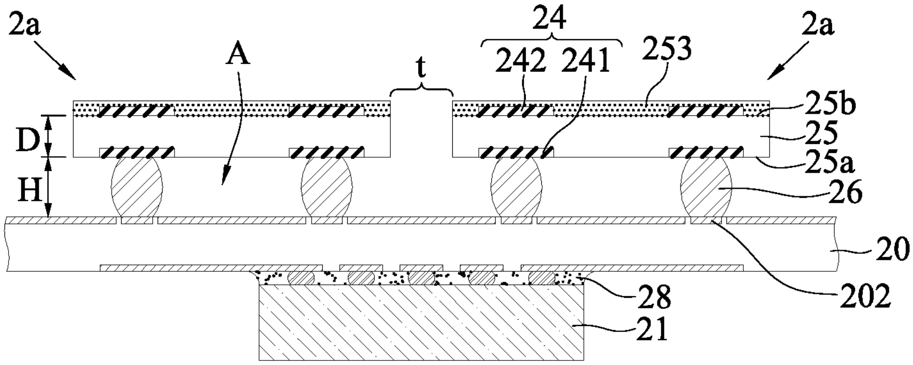

As shown in FIG. 2B, at least one antenna structure 2*a* is stacked on the second surface 20*b* of the carrier structure 20; and if a plurality of the antenna structures 2*a* are arranged, a gap t is remained between each of the antenna structures 2*a*.

The antenna structure 2*a* comprises a base 25 configured with an antenna body 24, and a plurality of conductors 26 disposed on the base 25, such that the base 25 is disposed on the second surface 20*b* of the carrier structure 20 via the plurality of conductors 26, so that at least one air gap A is formed between the base 25 and the carrier structure 20.

In an embodiment, the base 25 is a plate defined with a first side 25*a* and a second side 25*b* opposing the first side 25*a*, wherein the plurality of conductors 26 are disposed on the first side 25*a*, and the antenna body 24 has a first antenna layer 241 and a second antenna layer 242 separated from each other and disposed on the first side 25*a* and the second side 25*b* respectively. For instance, the base 25 is of a packaging substrate, such as a packaging substrate with a core layer and a circuit structure or a coreless circuit structure, so that the light and thin first antenna layer 241 and second antenna layer 242 can be formed by sputtering, vaporing, electroplating, electroless plating, chemical plating, or foiling on a dielectric material.

It should be understood that the first antenna layer 241 can also be adopted with a patch configuration, and the second antenna layer 242 can be adopted with a parasitic patch configuration. Further, an insulating protection layer 253 for covering the second antenna layer 242 can be formed on the second side 25*b* of the base 25 according to requirements.

Moreover, the first antenna layer 241 and the second antenna layer 242 transmit signal in a coupling manner. For instance, the first antenna layer 241 and the second antenna layer 242 can generate radiation energy by alternating voltage, alternating current, or radiation changes, and the radiation energy is an electromagnetic filed, such that the first antenna layer 241 and the second antenna layer 242 can be electromagnetically coupled with each other, so that the antenna signal can be transmitted between the first antenna layer 241 and the second antenna layer 242.

Furthermore, for example, the conductors 26 include solder material and are bonded onto the first side 25*a* of the base 25 to electrically connect the antenna body 24 and the carrier structure 20. For instance, the conductors 26 can be electrically connected to the first antenna layer 241 and the circuit layer 202 on the second surface 20*b* of the carrier structure 20, so that the conductors 26 can be used as feed lines, such that the antenna body 24 can be grounded via the circuit layer 202.

In addition, each of the conductors 26 is in the shape of a bump so as to form the air gap A with a required height H. For instance, the height H of the air gap A is at least 400 micrometers (μm), and the height H of the air gap A is not equal to a thickness D of the base 25.

Figures 1, 2C:
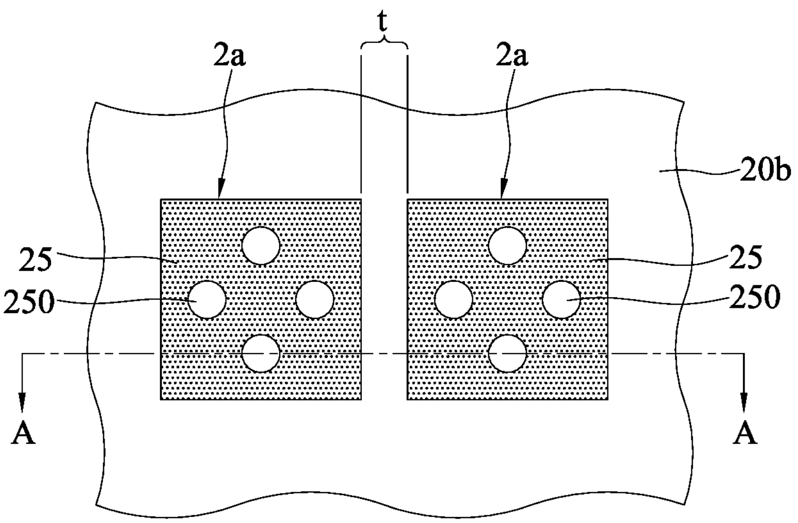
Figures 2, 2C:
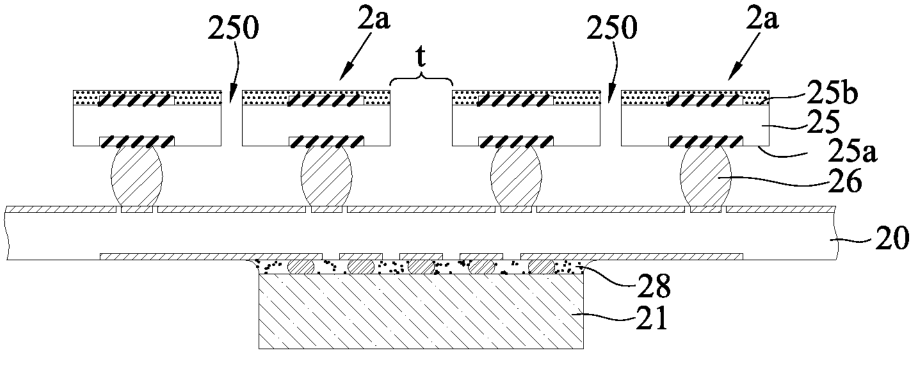

As shown in FIG. 2C-1 and FIG. 2C-2, at least one through hole 250 penetrating through the base 25 is formed on the antenna structure 2*a*.

In an embodiment, a laser is used, so that the through holes 250 can penetrate through the base 25 and communicate with the first side 25*a* and the second side 25*b* of the base 25, such as the through holes 250 shown in FIG. 2C-2 and the A-A section line shown in FIG. 2C-1. For instance, the through holes 250 are configured around the antenna body 24 and are free from penetrating through the antenna body 24.

Figure 2D:
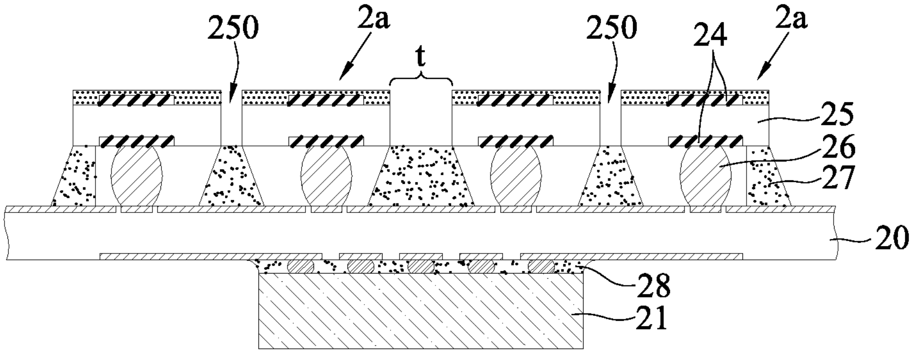

As shown in FIG. 2D, a plurality of insulating support bodies 27 are formed between the antenna structure 2*a* and the second surface 20*b* of the carrier structure 20.

Figure 3A:
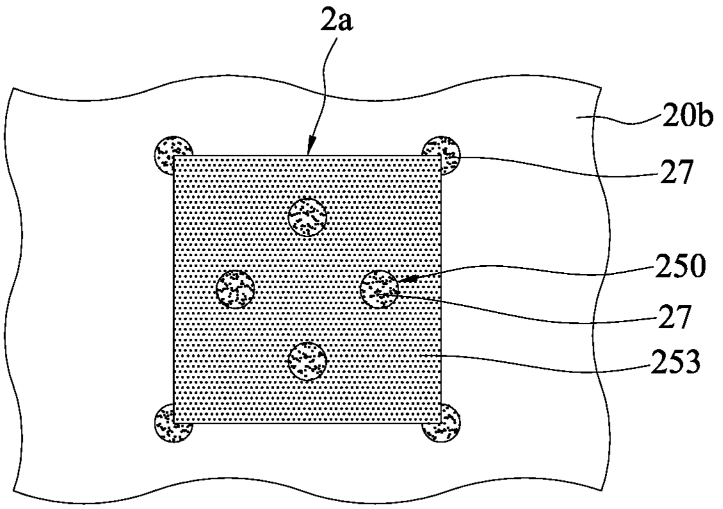
FIG. 3A is a schematic partial top plan view of FIG. 2D.
Figure 3B:
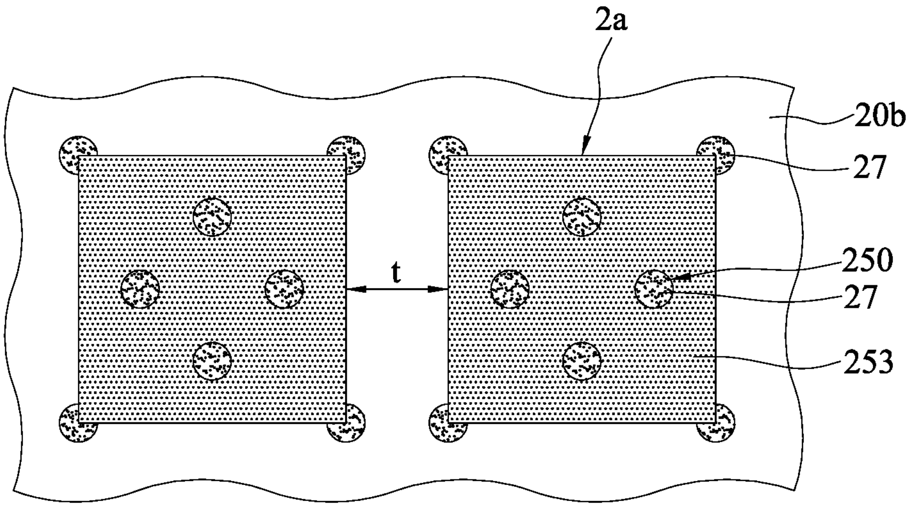
FIG. 3B is a schematic partial top plan view of FIG. 2D.
Figure 4A:
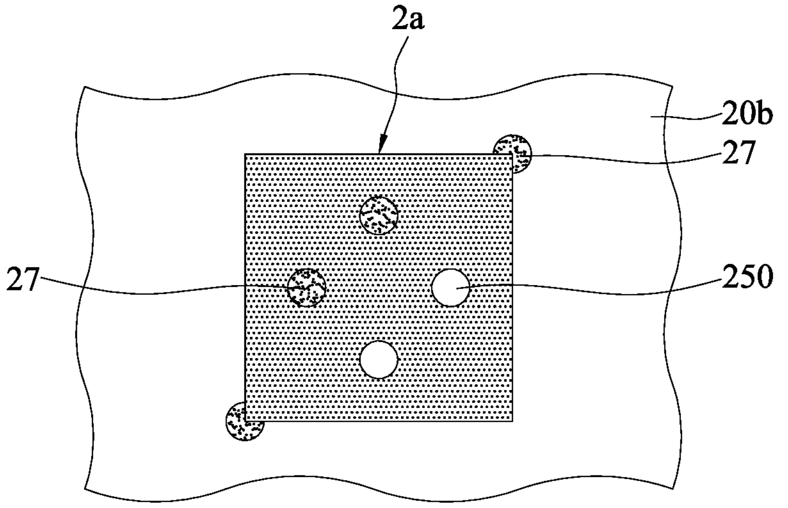
FIG. 4A, FIG. 4B and FIG. 4C are schematic partial top plan views showing other aspects of FIG. 2D.
Figure 4B:
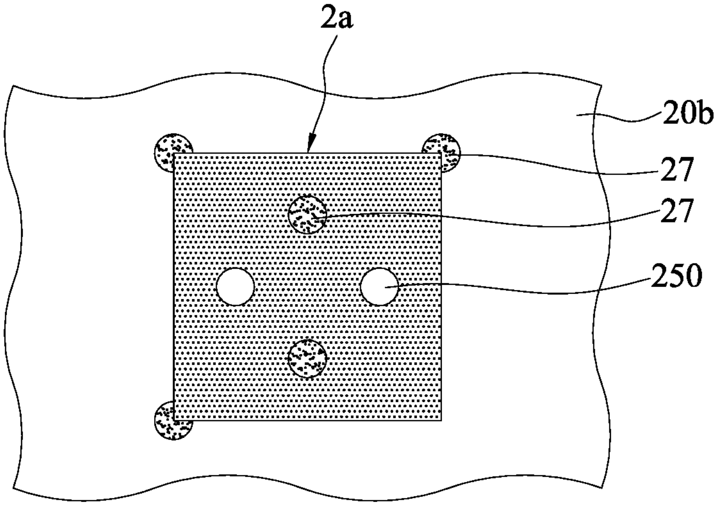
Figure 4C:
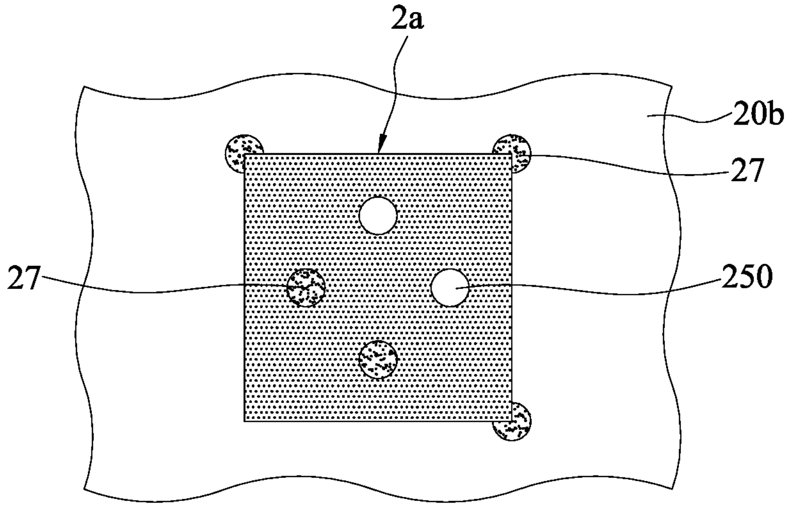

In an embodiment, each of the insulating support bodies 27 is an insulator made of such as an underfill material, and the insulating support bodies 27 are formed at the edges (e.g., at the corners) of the antenna structure 2*a* and/or are formed at positions corresponding to the through holes 250, as shown in FIG. 3A or FIG. 3B. For instance, the insulating support bodies 27 are formed by dispensing, such that each of the insulating support bodies 27 is in the shape of a column or a wall. It should be understood that the positions of the insulating support bodies 27 can be designed according to requirements. For example, as shown in FIG. 4A to FIG. 4C, the insulating support body 27 can be formed at at least one of the corners of the antenna structure 2*a* and/or at least one of the positions corresponding to the through hole 250, instead of forming at every corner of the antenna structure 2*a* and every position corresponding to the through hole 25.

Additionally, the insulating support body 27 is free from filling up the through hole 250, and may be even not formed within the through hole 250, so that the through hole 250 has an air medium.

It should be understood that the insulating support body 27 and the conductor 26 can be disposed separately from each other or disposed in contact with each other.

Figure 2E:
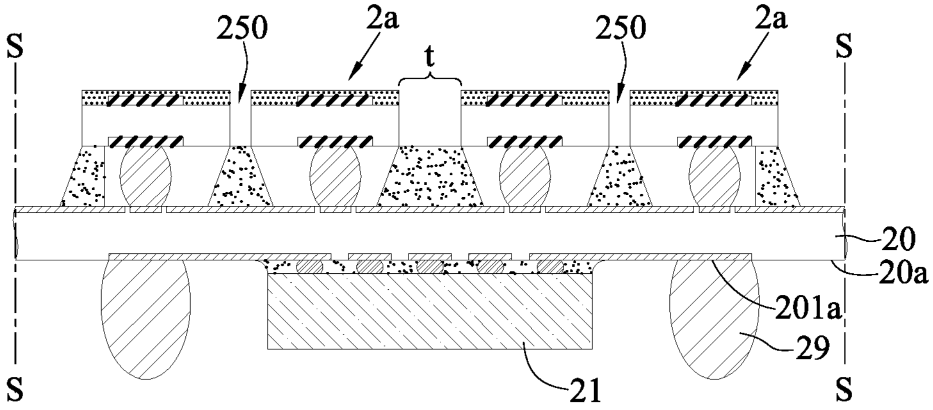

As shown in FIG. 2E, a plurality of conductive elements 29 are formed on the first surface 20*a* of the carrier structure 20.

In an embodiment, each of the conductive elements 29 is a solder ball and is bonded onto the external contact 201*a* of the circuit layer 201 of the first surface 20*a* of the carrier structure 20 to electrically connect the circuit layer 201, so that the conductive elements 29 can be subsequently connected to an electronic device such as a circuit board (not shown).

Figure 2F:
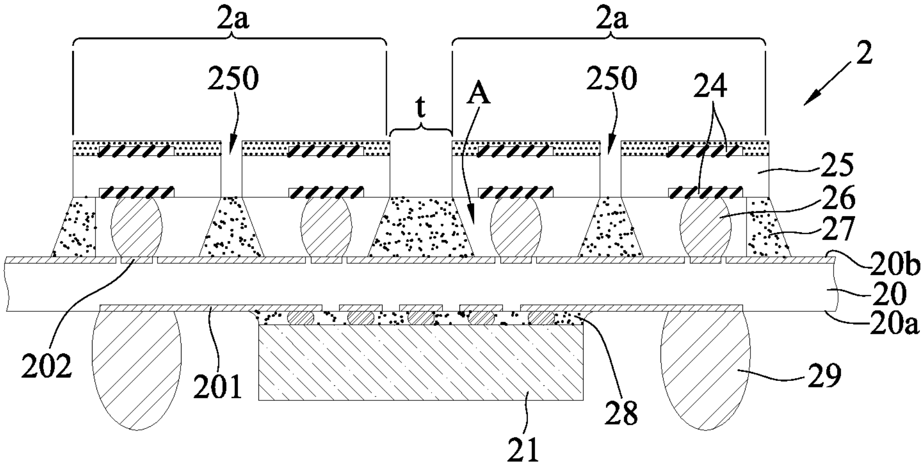

As shown in FIG. 2F, a singulation process is performed along cutting paths S shown in FIG. 2E to obtain a plurality of the electronic packages 2.

Therefore, in the method of manufacturing the electronic package 2 of the present disclosure, an Antenna-in-Package (AiP) specification is adopted. The through holes 250 and the air gaps A are formed at the antenna structure 2*a*, so that the characteristic of the dielectric constant of air being 1 can be utilized to reduce the signal loss and the signal offset so as to facilitate the signal transmission of the antenna body 24. Hence, compared with the prior art, the through holes 250 are disposed around the antenna body 24 so as to effectively improve the performance gain and efficiency of the antenna body 24, such that the strength of the electric field of the antenna body 24 is enhanced, thereby facilitating the signal transmission.

Besides, since the antenna structure 2*a* is bonded onto the carrier structure 20 via the conductors 26 containing solder material, the use of the conductors 26 not only makes the antenna structure 2*a* easy to bond with the carrier structure 20, but also facilitates the adjustment of the height H of the air gap A, so that the height H of the air gap A has flexibility in design.

In addition, if the height H of the air gap A is greater than the thickness D of the base 25 (as shown in FIG. 2B), the electronic package 2 can obtain much more gain.

The present disclosure also provides an electronic package 2, comprising: a carrier structure 20 having a plurality of circuit layers 201, 202; at least one electronic element 21 disposed on the carrier structure 20 and electrically connected to the circuit layer 201; and at least one antenna structure 2*a* stacked on the carrier structure 20.

The antenna structure 2*a* comprises a base 25 configured with an antenna body 24, and the base 25 can be disposed on the carrier structure 20 via at least one (or a plurality of) insulating support body 27, wherein the base 25 has at least one through hole 250 penetrating through the base 25, such that the insulating support body 27 is formed correspondingly at the through hole 250 and/or the edge of the antenna structure 2*a*, and the through hole 250 is free from being filled up by the insulating support body 27, so that the through hole 250 has an air medium.

In an embodiment, the carrier structure 20 has a first surface 20*a* and a second surface 20*b* opposing the first surface 20*a*, such that the electronic element 21 is disposed on the first surface 20*a*, and the antenna structure 2*a* is disposed on the second surface 20*b*.

In an embodiment, the antenna structure 24 has a first antenna layer 241 and a second antenna layer 242 separated from each other and disposed on opposite sides of the base 25 respectively. For instance, the first antenna layer 241 and the second antenna layer 242 transmit signal in a coupling manner.

In an embodiment, the base 25 is further stacked on the carrier structure 20 via at least one conductor 26. For instance, the conductors 26 are electrically connected to the antenna body 24 and the circuit layer 202.

In an embodiment, at least one air gap A is formed between the base 25 and the carrier structure 20.

In an embodiment, the electronic package 2 further comprises a plurality of conductive elements 29 disposed on the carrier structure 20 and electrically connected to the circuit layer 201.

To sum up, in the electronic package and manufacturing method thereof of the present disclosure, at least one through hole is formed at the base of the antenna structure and is penetrating through the base, so that the through hole has an air medium and is disposed around the antenna layer to facilitate the signal transmission of the antenna body. Therefore, the electronic package of the present disclosure can effectively improve the performance gain and efficiency of the antenna body, and can enhance the strength of the electric field of the antenna body to facilitate the signal transmission, so that the electronic package can provide required electrical functions for operating a 5G communication system so as to meet the requirements of the antenna operation of the 5G communication system.

The above embodiments are set forth to illustrate the principles of the present disclosure and the effects thereof, and should not be interpreted as to limit the present disclosure. The above embodiments can be modified by one of ordinary skill in the art without departing from the scope of the present disclosure as defined in the appended claims. Therefore, the scope of protection of the right of the present disclosure should be listed as the following appended claims.

What is claimed is:

1. An electronic package, comprising:

a carrier structure having a circuit layer;

an electronic element disposed on the carrier structure and electrically connected to the circuit layer; and an antenna structure stacked on the carrier structure, wherein the antenna structure comprises a base and an antenna body, wherein the antenna body is configured at and positioned directly on the base, wherein the base has at least one through hole penetrating through opposite sides of the base, and the through hole has an air medium, wherein the through hole is configured around the antenna body and a penetration direction of the through hole is free from penetrating through the antenna body, wherein the base is disposed on the carrier structure via at least one insulating support body, wherein the insulating support body is correspondingly formed at the through hole and is not formed within the through hole, such that the through hole has the air medium.

2. The electronic package of claim 1, wherein the insulating support body is further correspondingly formed at an edge of the antenna structure.

3. The electronic package of claim 1, wherein the carrier structure has a first surface and a second surface opposing the first surface, wherein the electronic element is disposed on the first surface, and the antenna structure is disposed on the second surface.

4. The electronic package of claim 1, wherein the antenna body has a plurality of antenna layers separated from each other and disposed on the opposite sides of the base respectively.

5. The electronic package of claim 4, wherein the plurality of antenna layers transmit signal in a coupling manner.

6. The electronic package of claim 1, wherein the base is stacked on the carrier structure via conductors, and the conductors are electrically connected to the antenna body and the circuit layer.

7. The electronic package of claim 1, wherein the base and the carrier structure have an air gap formed therebetween.

8. The electronic package of claim 1, further comprising a plurality of conductive elements disposed on the carrier structure and electrically connected to the circuit layer.

9. A method of manufacturing an electronic package, the method comprising:

providing a carrier structure having a circuit layer;

disposing an electronic element on the carrier structure, wherein the electronic element is electrically connected to the circuit layer;

stacking an antenna structure on the carrier structure, wherein the antenna structure comprises a base and an antenna body, wherein the antenna body is configured at and positioned directly on the base, wherein the base is formed with at least one through hole penetrating through opposite sides of the base, and the through hole has an air medium; and forming at least one insulating support body between the antenna structure and the carrier structure, wherein the insulating support body is correspondingly formed at the through hole and is not formed within the through hole, such that the through hole has the air medium, wherein the through hole is configured around the antenna body and a penetration direction of the through hole is free from penetrating through the antenna body.

10. The method of claim 9, wherein the insulating support body is further correspondingly formed an edge of the antenna structure.

11. The method of claim 9, wherein the carrier structure has a first surface and a second surface opposing the first surface, wherein the electronic element is disposed on the first surface, and the antenna structure is disposed on the second surface.

12. The method of claim 9, the antenna body has a plurality of antenna layers separated from each other and disposed on the opposite sides of the base respectively.

13. The method of claim 12, wherein the plurality of antenna layers transmit signal in a coupling manner.

14. The method of claim 9, wherein the base is stacked on the carrier structure via conductors, and the conductors are electrically connected to the antenna body and the circuit layer.

15. The method of claim 9, wherein the base and the carrier structure have at least one air gap formed therebetween.

16. The method of claim 9, further comprising forming a plurality of conductive elements on the carrier structure, wherein the plurality of conductive elements are electrically connected to the circuit layer.

* * * * *